J. W. WHITE.
COMBINED WHEEL HUB AND BRAKE DRUM.
APPLICATION FILED AUG. 8, 1919.
1,387,444.
Patented Aug. 9, 1921.
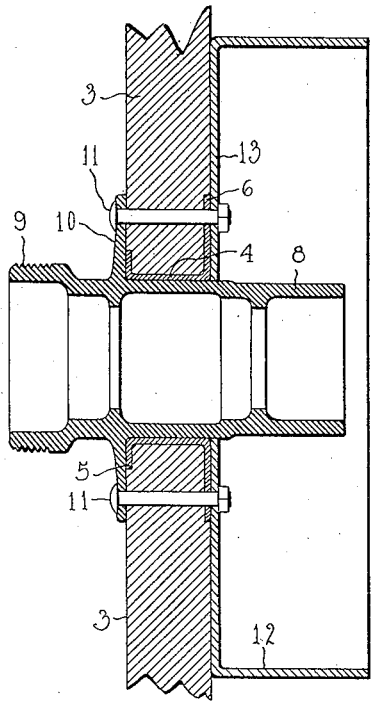
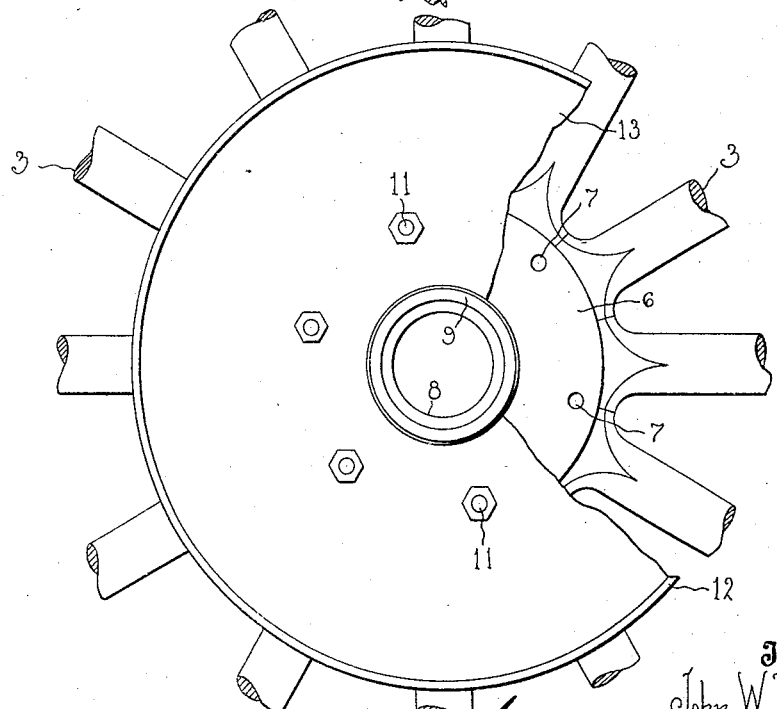

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

COMBINED WHEEL-HUB AND BRAKE-DRUM.

1,387,444.          Specification of Letters Patent.      Patented Aug. 9, 1921.

Application filed August 8, 1919. Serial No. 316,266.

*To all whom it may concern:*

Be it known that I, JOHN W. WHITE, a citizen of the United States, and resident of Detroit, Wayne county, State of Michigan, have invented certain new and useful Improvements in Combined Wheel-Hubs and Brake-Drums, of which the following is a specification.

My invention relates to combined wheel hub and brake drum construction designed for use in the wheels of automobiles, motor trucks and similar self-propelled vehicles, and the object thereof is to improve, simplify and reduce the cost of manufacture and assembly of the spokes of the wheel with the hub thereof, and with the brake drum; while at the same time providing a hub and brake drum construction which will be stronger than has heretofore been the case in similar constructions, and a construction in which the inner ends of the spokes will be more firmly held in place and more effectively secured against sidewise motion than has heretofore commonly been the case.

My improved wheel hub and brake drum construction is illustrated in its preferred form in the drawing accompanying and forming a part of this specification and in which:

Figure 1 is a view showing the inner ends of the spokes, the hub, and the brake drum of a wheel having my invention applied thereto; and, Fig. 2 is a view of so much of the wheel as is shown in Fig. 1 in side elevation, a portion of the brake drum being broken away.

Referring to the drawing, the reference numerals 3 designate the spokes of an automobile, motor truck or other wheel, the inner ends of which are widened and in contact with one another, as is usual in wheels of the class to which my invention relates.

The inner extremity of the spokes 3 abut against a sleeve 4, which sleeve is provided with outwardly extending flanges 5, 6, located one at each end thereof, and which flanges extend up along the sides of the inner end of the spokes. The inner ends of the spokes are therefore held in place and against sidewise movement by the side flanges of the sleeve independently of the brake drum and of the hub to be hereinafter described, thereby providing a hub and brake drum construction having securing means for holding the inner ends of the spokes in proper position relative to one another independent of and in addition to the securing function due to the brake drum 12 and the flange 10 of the hub when the parts of the wheel are assembled. The inner flange 6 is preferably made wider radially than the outer flange 5, and is provided with holes 7; and both of these flanges 5 and 6 lie within annular recesses provided for them in the sides of the inner ends of the spokes, as clearly shown in Fig. 1 of the drawing.

The reference numeral 8 designates the hub of the wheel, the same having a threaded outer portion 9 adapted to receive a hub cap as is usual in automobile and motor vehicle construction and which hub is provided with an outwardly extending flange 10 intermediate its ends, which flange is provided with a series of holes adapted to receive fastening bolts 11. The sleeve 4 above referred to fits upon the hub, as clearly shown in Fig. 1, which hub, therefore, affords support to the sleeve and to the inner ends of the spokes, although the said ends do not come into direct contact with the periphery of the hub, because of the intervening sleeve against which they abut. Suitable means will obviously be provided for operatively connecting the end of a driving axle with the hub to thereby drive the wheel, as is usual in motor vehicle drive wheel construction, which means, however, is not shown, as the same form no part of the invention to which this present application relates.

Secured to the inner side of the spokes as best shown in Fig. 1 is a brake drum 12, the same having an inwardly extending flange 13 provided with a hole at its inner end through which the hub 8 extends. The inner portion of this flange therefore lies in contact with the inner flange 6 of the sleeve 4, and the brake drum in its entirety is held in place by the securing bolts 11 above referred to which extends through the holes mentioned in the flange 10, through the inner ends of the spokes, through holes 7 in the flange 6, and through holes provided for them in the inwardly extending flange 13 of the brake drum. It therefore follows that when the parts are assembled and the bolts in place and tightened the spokes and all the parts of the combined hub and brake drum will be held together by the bolts, and furthermore that the inner ends of the spokes will be supported and held in place entirely independent of the hub flange 10 and the brake drum flange 13, because of the flanges 5 and 6 of the sleeve 4 between which their inner ends are held.

This construction permits the use of a thinner material in the manufacture of the brake drum than has heretofore commonly been the case in which the material of the inturned flange of the drum has been relied upon to afford support to the inner ends of the spokes; the inner ends of the spokes in the device herein, being supported and held in their assembled condition for the most part by the flanges 5, 6 of the sleeve 4, although it will of course be appreciated that the flange 6 is reinforced to a very considerable extent by the inner portion of the brake drum flange 13 thereby providing support and restraint against sidewise movement of the inner ends of the spokes due both to the flange 6 and to the inner portion of the flange 13 which overlies the same when the parts are assembled.

While I have described at length and in detail what I regard as the preferred form of my invention it will be appreciated that various changes and modifications thereof may be made, and that my invention includes all such variations and modifications of the form thereof illustrated, within the scope of the concluding claims, as will be obvious to those skilled in the art to which my invention relates.

Having thus described my invention, I claim as new and desire to secure by Letters Patent:

1. In a combined wheel hub and brake drum construction, a hub having an outwardly extending flange intermediate its ends; a sleeve surrounding said hub and having two outwardly extending flanges spaced apart from one another, and one of which is in contact with the flange of said hub; a plurality of separate and independent spokes the inner ends of which abut against said sleeve and are held in place between the flanges thereof; a brake drum having an inwardly extending flange in contact with the other of the flanges of said sleeve; and a plurality of fastening bolts extending through holes provided in the flanges of said hub and brake drum and through holes provided in said spokes and whereby the elements aforesaid are secured together.

2. In a combined wheel hub and brake drum construction, a hub having an outwardly extending flange intermediate its ends; a sleeve surrounding said hub and having two outwardly extending flanges spaced apart from one another and one of which is in contact with the flange of said hub and the other of which flanges is provided with a plurality of holes; a plurality of separate and independent spokes the inner ends of which abut against said sleeve and are held in place between the flanges thereof; a brake drum having an inwardly extending flange in contact with the second mentioned flange of said sleeve; and a plurality of fastening bolts extending through holes provided in the flanges of said hub and brake drum, through the holes in the flange aforesaid of said sleeve, and through holes provided in said spokes and whereby the elements aforesaid are secured together.

3. In a combined wheel hub and brake drum construction, a hub having an outwardly extending flange intermediate its ends; a sleeve surrounding said hub and having two outwardly extending flanges spaced apart from one another and one of which is in contact with the flange of said hub; a plurality of separate and independent spokes the inner ends of which abut against said sleeve and are held in place between the flanges thereof, and which spokes are provided with oppositely located annular recesses within which said flanges lie when the parts are assembled; a brake drum having an inwardly extending flange in contact with the other of the flanges of said sleeve; and a plurality of fastening bolts extending through holes provided in the flanges of said hub and brake drum and through holes provided in said spokes and whereby the elements aforesaid are secured together.

4. In a combined wheel hub and brake drum construction, a hub having an outwardly extending flange intermediate its ends; a sleeve surrounding said hub and having two outwardly extending flanges spaced apart from one another and one of which is of less width than and is in contact with the flange of said hub; a plurality of separate and independent spokes the inner ends of which abut against said sleeve and are held in place between the flanges thereof, and which spokes are provided with oppositely located annular recesses within which the flanges of said sleeve lie when the parts are assembled; a brake drum having an inwardly extending flange in contact with the other of the flanges of said sleeve; and a plurality of fastening bolts extending through holes provided in the last mentioned flange of said sleeve, in the flanges of said brake drum and said hub, and through holes in said spokes and whereby the elements aforesaid are secured together.

In testimony whereof I affix my signature.

JOHN W. WHITE.